March 3, 1964     O. N. ENNIS     3,123,364
SHAFT FLUID SEAL AND PROCESS OF REBUILDING THE SAME
Filed April 25, 1962     2 Sheets-Sheet 1

FIG.I.
PRIOR ART

INVENTOR
Olin N. Ennis

BY Wilkinson, Mawhinney & Theibault
ATTORNEYS

March 3, 1964  O. N. ENNIS  3,123,364
SHAFT FLUID SEAL AND PROCESS OF REBUILDING THE SAME
Filed April 25, 1962  2 Sheets-Sheet 2

INVENTOR
Olin N. Ennis

BY Wilkinson, Mawhinney & Theibault
ATTORNEYS

United States Patent Office 3,123,364
Patented Mar. 3, 1964

3,123,364
SHAFT FLUID SEAL AND PROCESS OF
REBUILDING THE SAME
Olin N. Ennis, Box 68, Clio, Mich.
Filed Apr. 25, 1962, Ser. No. 190,072
9 Claims. (Cl. 277—1)

The present invention relates to shaft fluid seal and process of rebuilding the same, and has for an object to provide a process for rebuilding shaft fluid seals in which all machining of worn parts is eliminated and in which replacements are made by operations wholly of an assembly nature whereby substantial economies are effected, much time saved and restoration to original tight sealing condition results.

Another object of the invention is to provide a process of rebuilding shaft fluid seals in which a fillet is assembled to a worn part presenting a new sealing surface and in which the spring projected cooperating sealing element is readjusted to a new position to compensate for the introduction of the fillet to the end that an operative member on the shaft may be brought to its correct operating position relative to other associated members in the reassembly of the repaired and rehabilitated device.

A further object of the invention is to provide a shaft fluid seal in which a replaceable fillet having a fluid sealing surface is added to the worn part and the complemental sealing unit readjusted to a position where it will properly cooperate with the fillet.

A still further object of the invention is to provide a shaft fluid seal in which revision of a spring projected sealing member provides for the additional space occupied by the added fillet whereby said spring projected sealing element may occupy a correct cooperative position with respect to the new sealing surface of the added fillet in a manner which will allow an operative member on the shaft to assume its original position relative to other associated parts.

For convenience in description the invention has been illustrated and will be described hereinafter in connection with a single form of the invention involving a fluid or coolant pump commonly used on internal combustion engines in the automotive field.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
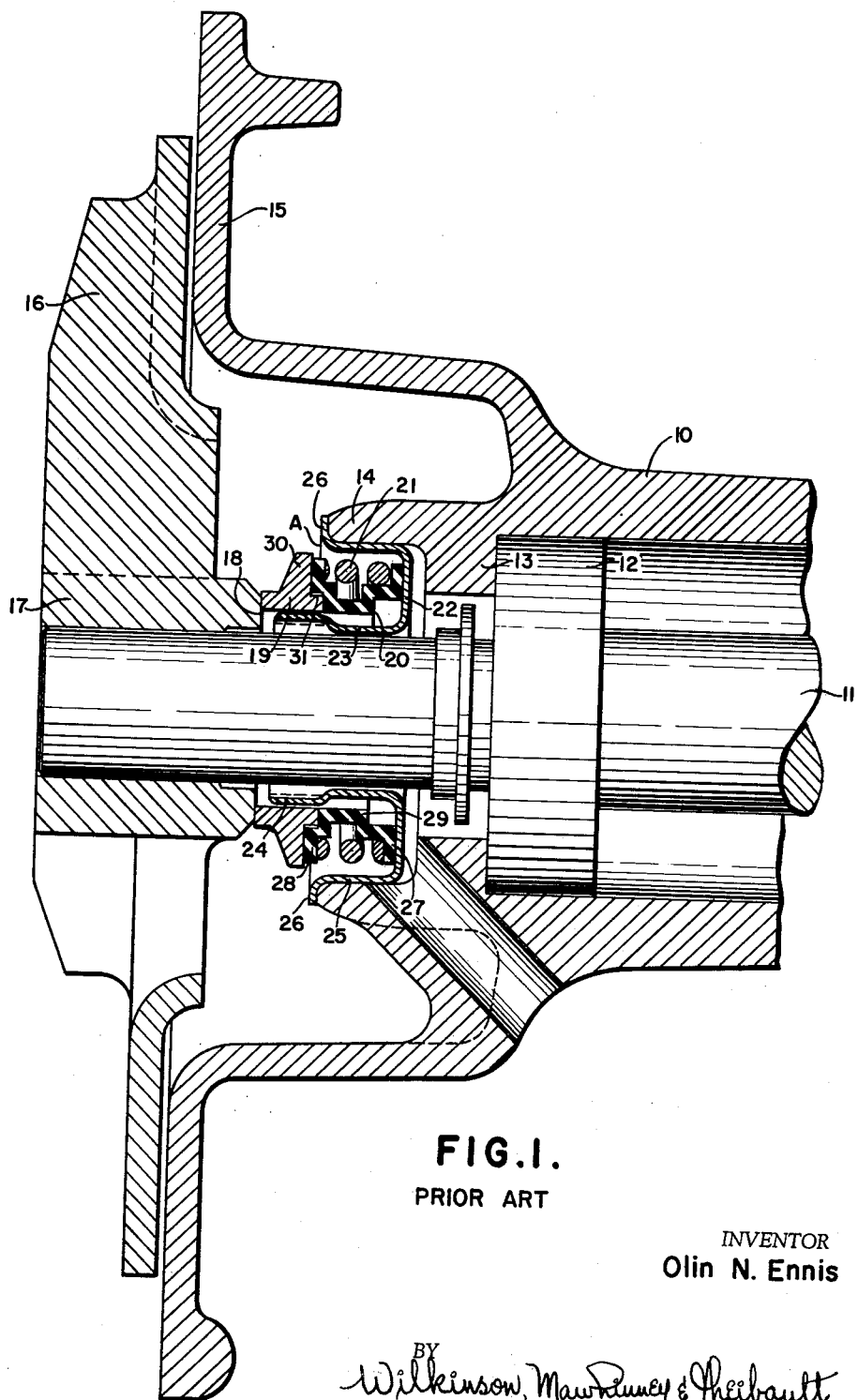
FIGURE 1 is a vertical sectional view taken through an engine block showing the water pump shaft and its impeller, and a shaft fluid seal as constructed in accordance with the prior art.

Referring more particularly to the drawings, and for the present to FIGURE 1 which shows the prior art, 10 designates an engine block, crank case, or other housing part, and 11 represents a pump or other shaft mounted for driven rotation in the block 10 and at least partially supported by a bearing 12. The bearing is located adjacent a structural web 13 and a forwardly projecting hollow boss 14.

At 15 is designated the rear member of the water pump casing which may be integral with the engine block 10. The forward end of the shaft 11 extends into the pump casing and receives thereon a pump impeller 16 having a hub 17, which according to current conventional practice, is press fitted to the shaft 11 to be driven rotationwise therewith.

The rear end 18 of the hub 17 constitutes a sealing surface against which is projected a sealing washer 19 under the influence of a coil spring 21. This coil spring 21 and a conventional form of boot 20 are mounted in a casing or cartridge, the components of which, according to current practice, are described as follows:

A rear cartridge wall 22 is disposed radially of the shaft 11, and a rear inner section 23 of the inner wall of the cartridge surrounds the included portion of the shaft 11 but appreciably is slightly spaced therefrom so that the shaft may rotate freely within the cartridge case. A forward section of the inner wall of the cartridge has radially outward offset portions 24 to slidingly receive an annular washer 19.

An outer wall 25 of the cartridge extends forwardly from the outer portion of the rear wall 22, and is of a diameter to snugly fit into the boss 14 to frictionally engage the internal wall of this boss 14 to resist any tendency of rotation of the cartridge or its components. This outer wall 25 is provided at its forward end with an outturned flange 26 adapted to lap or extend in front of the forward edge or nose of the boss 14 for the purpose of limiting the axial rearward movement of the cartridge and to require the cartridge on home placement to take up a proper relative position with respect to the boss 14 and the sealing end surface 18 of the impeller hub 17.

The boot includes a rear outturned flange 27 and a forward outturned flange 28. The rear outturned flange 27 abuts the forward face of the rear cartridge wall 22, while the forward face of the forward outturned flange 28 abuts the rear surface of a radial flange 30 of the washer 19. The boot 19 further includes an initial offset central portion 29 which at its forward end may abut the rear end of the sealing washer 19. The coil spring 21, as to its rear convolution, engages against the forward surface of the rear outturned flange 27 of the boot and urges this flange against the cartridge rear wall 22; while the most forward convolution of the spring 21 engages the forward outturned flange 28 of the boot. When under compression, the spring 21 will shift the sealing washer 19 forwardly against the sealing surface 18 of the impeller hub 17.

The foregoing parts are furnished with new car construction. Owing to the fact that the sealing washer 19 is nonrotatable and the hub 17 rotates with the shaft 11, wear takes place between the two surfaces which are provided to form a tight seal, preventing the escape of water from the impeller casing into the moving parts of the engine and the vehicle.

The washer 19 is composed of hard carbon and graphite, while the impeller 19 and its hub 17 are normally of cast metal and consequently the wear will take place at the surface 18.

The wear will eventually reach a condition where leakage will occur and where the working height of the spring 21 will be exceeded and in which, if repair is not performed, the spring helix will eventually approach or reach its free height; in which event little pressure thereby will be exercised on the washer 19 in a direction against the sealing surface 18 of the hub 17.

Heretofore repair has been made by removing the impeller 16 from the shaft 11 and regrinding the sealing surface 18, and then replacing the impeller on the shaft with at least in some cases renewal springs of greater working and free heights to compensate for the diminution of the surface 18 created by the regrinding operation.

Figure 2:
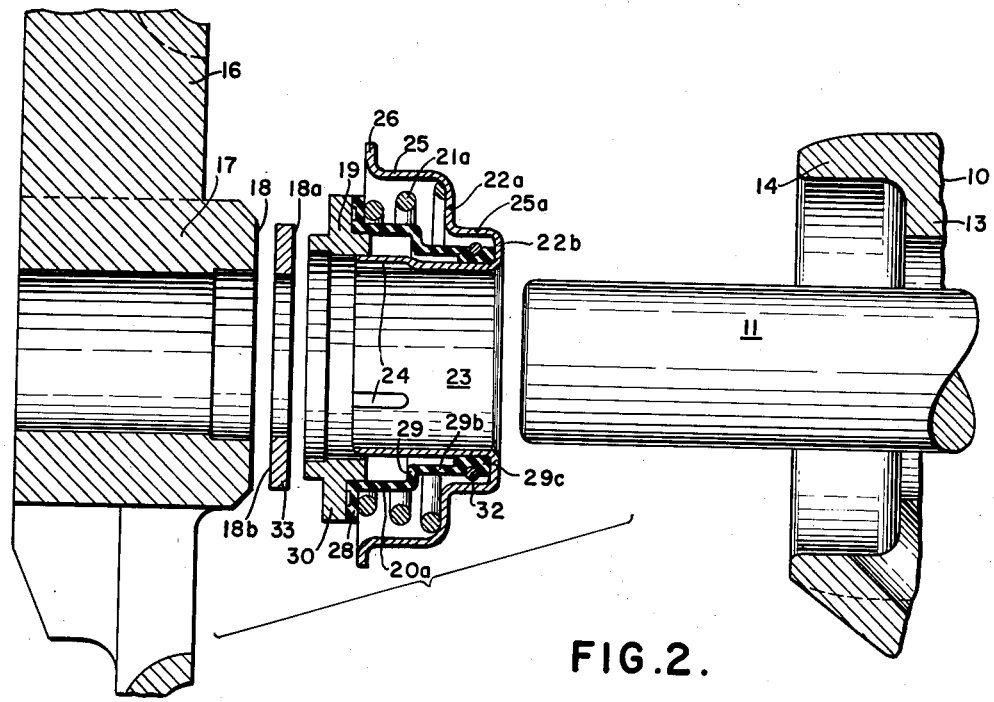
FIGURE 2 is a vertical sectional view, with parts exploded, taken on an enlarged scale and illustrating a repair member and revised form of sealing cartridge as constructed in accordance with the present invention.
Figure 3:
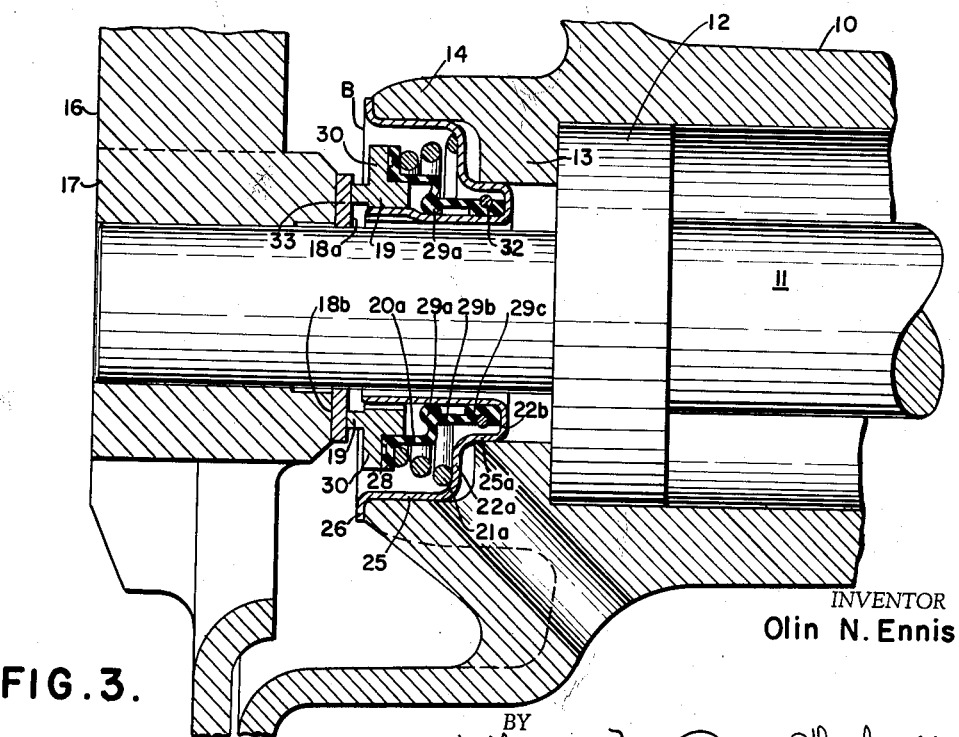
FIGURE 3 is a vertical sectional view showing the same in assembled form.

Pursuant to the invention, and referring more particularly to FIGURES 2 and 3, the regrinding operation, together with its cost, is eliminated by supplying a repair part 33 in the nature of a fillet which is in the form of an annulus or ring having an inside diameter approximately that of the hub 17 so that the same may be press fitted or otherwise mounted tightly upon the shaft 11 between the worn hub sealing surface 18 and the contacting foremost end of the sealing washer 19, this being accomplished by pulling the impeller, introducing the ring 33, and thereafter restoring the impeller to its correct axial position upon the shaft 11 relatively to the pump casing in the original position occupied by the impeller in new car condition. These rings 38 preferably will be the product of screw machines which will turn out extremely economical cast rings with sealing surfaces $18^a$ and $18^b$ which may be interchangeably used to present to the washer 19 successive sealing surfaces whereby, after wear of one surface $18^a$, the ring 33 may be reversed to present the opposite sealing surface $18^b$ to the washer 19, thus enabling two stages of repair to be made with the single part 33.

However, the supplying of a fresh sealing surface $18^a$ and/or $18^b$ is only possible when using a minimum axial thickness of ring 33 which is in excess of the axial length of wear taking place in the original hub sealing surface 18.

It will be understood that the impeller 16 must be replaced in the same axial position it occupied originally and therefore the use of the annulus 33 will introduce into the construction an added axial thickness not present in the original. This condition requires that the washer 19, at its working height, shall be displaced rearwardly along the shaft 11 a distance equivalent to the new axial thickness introduced by the ring 33.

Owing to the presence of the structural web 13, an identical form of cartridge cannot be used as the rear wall 22 would have to be set back a distance which would have to overlap this wall.

The rubber sealing boot, at the free height of the spring, requires that the cartridge casing be of an axial length to accommodate the same in a substantially expanded form. To achieve this end, the cartridge casing is modified to provide a fore section $22^a$ of the rear wall of the cartridge and an aft section $22^b$ which is offset rearwardly from the fore section $22^a$. Between these sections $22^a$ and $22^b$ is a stepped-down aft section $25^a$ of the outer wall 25 of the cartridge case, such stepped-down aft section $25^a$ being of diameter less than the inside diameter of the web 13 so that this diametrically diminished rear portion of the cartridge case can be conveniently fitted within the space included concentrically within the structural web 13, as best seen in FIGURE 3, in the working position of the parts.

In achieving this result, the rubber boot $20^a$ is also modified in construction in that it is formed with a radial intermediate section $29^a$ which steps down a rear inwardly offset section $29^b$ terminating rearwardly in a thickened rearmost section $29^c$ of the boot which engages the inner surfaces both of the part 23 of the cartridge case and the aft rear wall section $22^b$ thereof. In this position, the thickened section $29^c$ is held tightly in place by a snap ring 32 which constricts a portion of the rubber boot, as shown in FIGURES 2 and 3.

The condition as before described requiring the setting of the washer 19 further rearward at the working height of the spring is furthermore compensated for by rearrangement and reforming of the spring helix from the cylindrical form of FIGURE 1 in the original construction to that of a taper form of spring $21^a$ in which successive helices from the foremost convolution to that of the rearmost convolution increase progressively in diameter so that while the foremost convolution engages the forward outturned flange 28 of the boot, subsequent convolutions of progressively increasing diameter are disposed at increased radial distances from the boot $20^a$ until the rearmost convolution rises up and engages the inner surface of the cartridge case at the angle between $22^a$ and 25. This taper form of spring offers a greater effective spring length than the cylindrical arrangement of FIGURE 1. This enables the spring to be received in the axially shortened distance between the flange 30 and a rear wall portion $22^a$. Such arrangement also dispenses with the thickness of the rear outturned flange 27 of FIGURE 1 and enables the rearmost convolution of the spring to engage, not the boot, but directly against the cartridge case parts. Therefore the restriction of space for accommodating the spring helix occasioned by the relocation of the washer 19 to a new rearward working location incident to introduction of the greater thickness of the ring 33 is overcome by the taper form of spring, the removal of boot part 27 from between the rear spring convolution and the cartridge case, and by supplying a boot $20^a$ of a revised form in which the rear end of the boot has now no association with the rear portion of the spring, and the revision and expansion of a stepped-down rearmost part of the cartridge case to accommodate the boot $20^a$ in its necessary length in an axial direction.

FIGURE 2 is illustrative generally of the free height of the taper spring helix $21^a$, while FIGURES 1 and 3 are illustrative generally of the working heights of the springs 21 and $21^a$. By comparing these two figures of the drawings it will be seen that the vertical line A dropped from the forward surface of the flange 26 is much further removed rearwardly from the sealing surface 18 in FIGURE 1 than the similar vertical line B of FIGURE 3 from the sealing surface $18^a$ of the fillet or ring 33. At the working height of the spring $21^a$ in FIGURE 3, the coils approach closer to a shut height than the helices of the spring 21 in FIGURE 1, but the taper or conical form of the spring of FIGURES 2 and 3 permits this closer approach to the closed height without diminishing the effectiveness of the expansion action of the spring as applicable to the value of the sealing effect between washer 19 and sealing surface $18^a$. As a matter of fact, the kinetic energy developed by the taper form of spring from a more nearly shut height is greater than that of a co-axial cylindrical spring operating from a more open condition. The sealing effect is therefore enhanced.

It will be understood that the pump impeller 16 is merely representative of any rotor, and the so-called washer 19 is representative of a form of sealing member and that the forms of the coil springs or resilient members and boot are preferred forms and admit of variation, as is also the means 32 for binding the rear end of the boot to the cartridge case.

The pitch of the spring helix may be varied as desired, and the lead of the convolutions may be made less coarse, that is, finer, in adapting the cartridge unit to the new situation presented by the introduction of the fillet or ring 33.

It will be understood by those skilled in the art that the purpose of the invention is to eliminate the machining of worn seal mating surfaces and to eliminate the replacement of worn seal mating surface parts, such as impellers in the repair of fluid pumps containing fluid shaft seals by installing a separate seal seat fillet on shaft to replace the worn seal seat on the impeller, and by redesigning the seal cartridge or case to allow room for the installation of the seal seat fillet between the worn seal seat and the mating sealing surface on the seal assembly.

It will be appreciated by those skilled in the art that the above are an enumeration of desirable results in effecting repairs to worn and leaky parts of sealing joints and that the repair, while eliminating expensive grinding and other operations, secures a better seal than that originally provided by the new cars parts.

Although I have disclosed herein the best form of the invention known to me at this time, I reserve the right to all such modifications and changes as may come within the scope of the following claims.

What is claimed is:

1. The process of rebuilding shaft fluid seals in which a free end sealing face of the hub of a rotor on the shaft becomes worn and leaky by contact of a pressure member comprising (a) inserting between the worn sealing face and the pressure member a fillet having a fresh sealing face, and (b) readjusting the pressure member to compensate for the added thickness of the fillet.

2. The process as claimed in claim 1 in which element (b) comprises (c) shifting the pressure member a distance away from the sealing face of the hub substantially commensurate with the added thickness of the fillet less the axial amount of wear of the hub sealing face.

3. The process as claimed in claim 1 in which element (b) comprises (c) lowering the working height of the pressure member.

4. The process of rebuilding shaft fluid seals in which a free end sealing face of the hub of a rotor on the shaft is contacted by a harder complemental sealing member under pressure of a helical spring comprising (a) introducing a fillet between the sealing face when worn and the complemental sealing member adding incidental axial bulk between the hub and sealing member, and (b) reducing the working height of the spring to compensate for such added bulk to substantially maintain original preselected spring pressure application to the complemental sealing member.

5. The process of rebuilding shaft fluid seals in which a free end sealing face of the hub of a rotor on the shaft becomes worn and leaky by contact with a pressure member yieldably urged against the sealing face by a coil spring associated with a sealing boot comprising (a) introducing a fillet having a new sealing face between the hub and pressure member adding axial bulk between the hub and member proportionately displacing the member, (b) displacing the boot further axially away from the hub, and (c) reducing the free height of the spring.

6. For use with a housing member having a structural web, a shaft journaled in the housing member, a rotor on the shaft having a sealing face subject to wear, and a sealing pressure member normally contacting the rotor sealing face, a repair improvement comprising (a) a fillet fitted against the worn rotor sealing face, said fillet having (b) a fresh sealing face disposed in contact with the sealing pressure member, (c) a cartridge in the housing in which the pressure member is movable, said cartridge having (d) an offset portion included within the web, (e) a boot in the cartridge having a fore portion bearing against the pressure member and a rear portion received in the offset portion, and (f) resilient means in the cartridge engaging the fore portion of the boot to bias such fore portion and the pressure member to a forwardly projected position forcibly contacting the sealing face of the fillet.

7. A repair improvement as claimed in claim 6 in which (g) the resilient means is a taper coil spring having a rear end seated against the cartridge.

8. A repair improvement as claimed in claim 6 further comprising (g) means for affixing the rear end portion of the boot to the cartridge independently of the resilient means (f).

9. A repair improvement as claimed in claim 6 in which (g) the boot (e) is a resilient tube having fore and aft relatively offset portions.

No references cited.